United States Patent [19]
Lorimer et al.

[11] Patent Number: 4,508,688
[45] Date of Patent: Apr. 2, 1985

[54] METHOD OF REGENERATING ACETATE IN A METAL REMOVAL PROCESS

[75] Inventors: Christopher C. Handy, Jr., Vineland; D'Arcy H. Lorimer, Mercer County, both of N.J.

[73] Assignee: AT&T Technologies, Inc., New York, N.Y.

[21] Appl. No.: 499,714

[22] Filed: May 31, 1983

[51] Int. Cl.³ .............................................. C01G 21/14
[52] U.S. Cl. ................................ 423/92; 23/302 R; 23/302 T; 23/295 R; 260/436; 423/512 A; 562/608
[58] Field of Search ............ 260/436; 562/608, 302 R; 23/302 T, 295 R; 423/92, 512

[56] References Cited

U.S. PATENT DOCUMENTS

| | | | |
|---|---|---|---|
| 56,505 | 7/1866 | Fournier | 260/436 |
| 396,275 | 1/1889 | Fell | 423/512 A |
| 608,028 | 7/1898 | Charlier | 423/512 A |
| 766,133 | 7/1904 | Bailey | 260/436 |
| 779,290 | 1/1905 | Lihme | 562/608 |
| 1,297,792 | 3/1919 | Camus et al. | 260/436 |
| 1,492,717 | 5/1924 | Lichtenthaeler | 562/608 |
| 1,857,520 | 5/1932 | Stone | 562/608 |
| 1,866,328 | 7/1932 | Strosacker et al. | 23/302 R |
| 1,916,302 | 7/1933 | Curtin | 260/436 |
| 1,940,611 | 12/1933 | Strosacker et al. | 562/608 |
| 2,033,985 | 3/1936 | Haney | 562/608 |
| 2,151,990 | 3/1939 | Ruys | 23/295 R |
| 2,328,089 | 8/1943 | Mulligan | 260/436 |
| 2,839,390 | 6/1958 | Galloway | 423/104 |
| 2,959,605 | 11/1960 | Kebrich | 260/436 |
| 3,780,077 | 12/1973 | Schwarze et al. | 260/436 |

FOREIGN PATENT DOCUMENTS

| | | | |
|---|---|---|---|
| 37611 | 4/1978 | Japan | 562/608 |
| 3116832 | 2/1982 | Netherlands | 562/608 |
| 6711 | of 1895 | United Kingdom | 562/608 |
| 421137 | 12/1934 | United Kingdom | 562/608 |
| 445108 | 4/1936 | United Kingdom | 562/608 |

OTHER PUBLICATIONS

Chemical Abstracts 78(12), 74027w.

Primary Examiner—John Doll
Assistant Examiner—Wayne A. Langel
Attorney, Agent, or Firm—Joel F. Spivak

[57] ABSTRACT

A process for separating lead includes the steps of dissolving a water insoluble lead salt in an acetate solution and precipitating the lead by treating the acetate solution with a sulfite so as to form an insoluble lead sulfite. The acetate is recovered by concentrating the solution and precipitating the acetate therefrom, drying the acetate crystals and dissolving them in methanol. The methanol is then evaporated leaving purified acetate crystals. The process is shown as part of a precious metal recovery system in the treatment of tankhouse slime.

19 Claims, 3 Drawing Figures

METHOD OF REGENERATING ACETATE IN A METAL REMOVAL PROCESS

TECHNICAL FIELD

This invention relates primarily to metal separation processes which utilize acetate in the process and more particularly to the regeneration of the acetate used in the process as well as the recovery of lead.

BACKGROUND OF THE INVENTION

The removal or separation of lead from other metals has been both a primary and a secondary object of various metal recovery schemes.

For example, U.S. Pat. No. 1,918,817 issued to C. L. Mantell is primarily concerned with the removal and recovery of lead which is present as coatings in tubes, template and scrap for example. In accordance with this patent, lead is separated from an underlying metal by chemical dissolution of the lead in either a saturated aqueous sodium chloride solution containing from 0.5–10% sulphuric acid or acid sulphates; a 1–10% $FeCl_3$, 2–10% $NaNO_3$ solution; a 1–10% NACl, HCl and 2–10% $NaNO_3$ solutions; or solutions containing soluble sulphates, nitrates and acetates in combination.

Similarly, U.S. Pat. No. 2,839,390 addresses the removal of lead and zinc from their ores by chemical dissolution. Here, lead and zinc, if not already in the form of their sulfides, e.g., in galena and sphalerite, are converted to their sulfides. The sulfides are then reacted with oxalic acid converting the lead and zinc to their respective oxalates and evolving $H_2S$ gas. The product is filtered and the filter cake containing the oxalates is treated with an aqueous calcium acetate solution resulting in the formation of soluble lead and zinc acetates and insoluble calcium oxalate. The calcium oxalate precipitate is collected and reacted with sulfuric acid to regenerate oxalic acid while the solution is reacted with zinc so as to precipitate lead from the solution while forming more zinc acetate. The zinc may then be recovered by adding calcium hydroxide to the solution.

In still another process of commercial interest, lead recovery is not the primary object, however lead is an impurity which often must be separated from the desired metals to achieve the desired purity. Therefore, the lead removal may be said to be secondary to (albeit necessary) the recovery of the primary metals. Such a process occurs, for example, in the treatment of tankhouse slime for the recovery of copper and precious metals, e.g., gold, silver and palladium. Tankhouse slime is the residue which results or collects during the electrolytic deposition of copper. This residue generally contains lead impurities which must be removed in order to recover pure precious metals which are also present in the slime. One commercial procedure employed in such recovery processes can be found with reference to an article entitled "Recent Methods for the Treatment of Anodic Slimes of Copper Electrolysis" by F. Habashi appearing in *Metallurgia*, December 1965, pp. 257–263. However, this article is not directed to lead separation.

A very recent article in *Chemical Abstracts* Vol. 98, 1983, page 224, which article postdates the work of the inventors herein, teaches lead removal from decoppered anodic slime by leaching the lead containing solution with ammonium acetate solution and then crystallizing lead acetate.

SUMMARY OF THE INVENTION

A process for separating lead in the form of lead sulfate from other metals includes the steps of treating the lead sulfate with an aqueous acetate solution so as to dissolve the lead, filtering, adding sulfite ions to the filtrate to precipitate the lead and filtering out the precipitate.

The remaining aqueous acetate solution which further contains sulfite and sulfate ions can then be processed to recover the pure acetate by heating and concentrating the solution, then cooling and crystallizing the acetate and some of the impurities, drying the crystals to remove water of hydration, dissolving the acetate crystals in methanol leaving sulfate and sulfite crystals undissolved, filtering and then evaporating the methanol leaving pure acetate crystals.

DETAILED DESCRIPTION

The novel processes will be described with reference to their use in the treatment of tankhouse slime for the purpose of recovering copper and precious metal values present in the slime. It should be obvious, however, to one of ordinary skill in the art that the processes described herein are applicable to the separation of lead from starting materials other than tankhouse slime. Further, it should be obvious that the acetate recovery and recycling scheme taught herein is also applicable for use whenever the acetate is to be separated from sulfate or sulfite impurities.

It should be further noted that the lead removal process taught herein is particularly suitable in the recovery of precious metals from electrolytic copper tankhouse slime since essentially no precious metal values are lost in this portion of the overall process.

Figure 1:
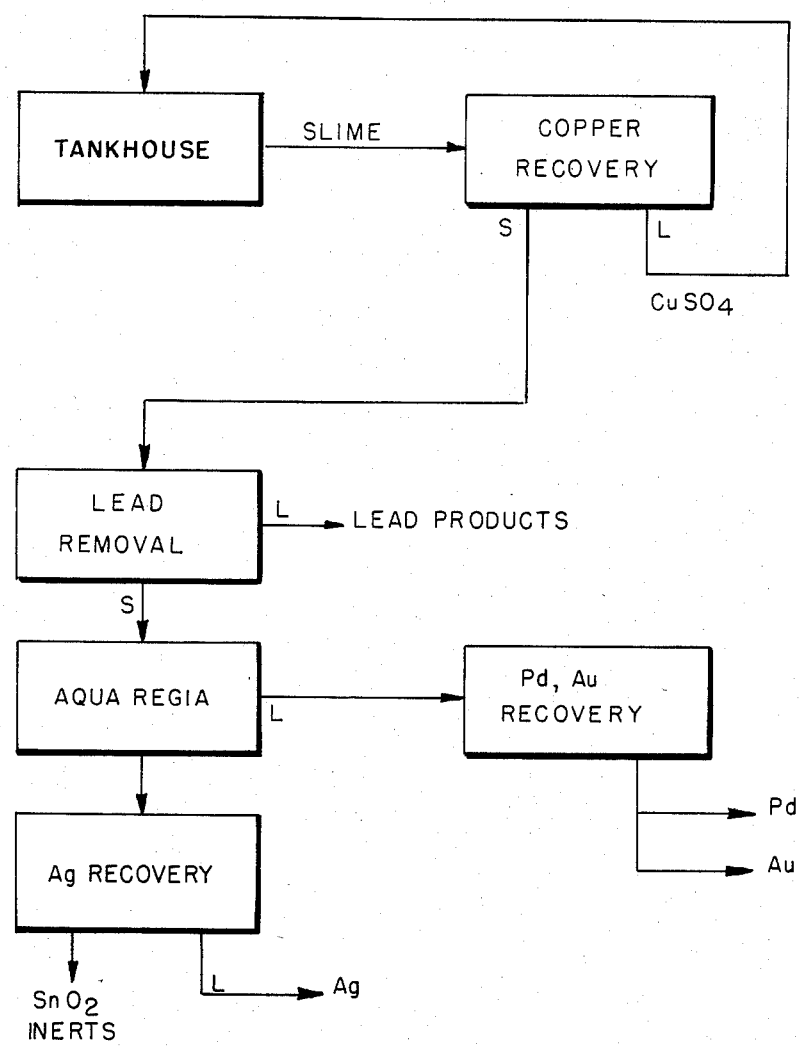
FIG. 1 is a flow diagram showing the general processing steps leading to the recovery of precious metals from tankhouse slime.

Referring to FIG. 1, there is shown the general process for the recovery of precious metals from electrolytic copper tankhouse slime. The metal content of the slime resulting from the electrolytic deposition of copper is predominantly copper but also typically contains lead, zinc, tin, antimony, nickel, iron and precious metals such as silver, gold and palladium. In addition, there is a large amount of sulfate ion present resulting from the acidic copper sulfate solution used in the electrolytic refining of copper. FIG. 1 indicates liquid flow as 'L' and solids as 'S'. In accordance with FIG. 1; the slime is first treated to remove copper, e.g, by converting the copper to a water soluble copper sulfate. The solids which remain are then treated so as to remove lead as will be more fully explained hereinafter. The solids remaining after lead removal are then digested in aqua regia, palladium and gold going into solution and the solution processed to recover the individual precious metals therefrom. The solids remaining after aqua regia digestion are processed so as to recover silver.

Figure 2:
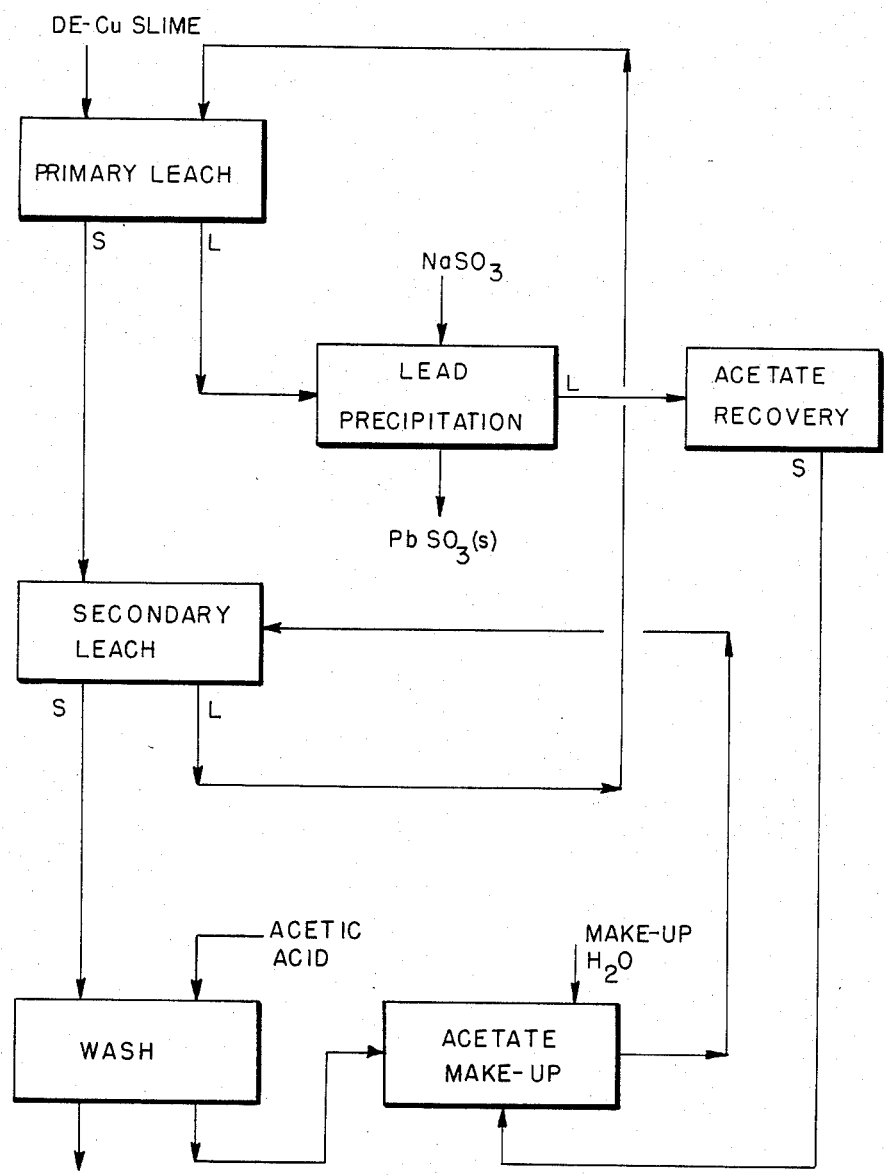
FIG. 2 is a more detailed flow diagram of the lead removal portion of FIG. 1 including acetate regeneration.

FIG. 2 is a flow diagram which more specifically sets forth the lead removal process referred to in connection with FIG. 1. In accordance with this process, lead which is present in the decopperized slime primarily as lead sulfate is treated (primary leach) with an aqueous sodium acetate solution. The resulting slurry is filtered and the filtrate collected for lead precipitation. The precious metal-containing slime filter cake is re-slurried (secondary leach) with fresh sodium acetate and filtered. The filtrate is returned to the primary leach solution for reuse while the filter cake is washed with an acetic acid solution. The wash solution is combined with sodium acetate crystals and water to form an acetate make-up solution for the system. The remaining solids then go to the aqua regia treatment step set forth in FIG. 1.

The lead which is leached from the slime in the form of a lead acetate solution is precipitated essentially completely as lead sulfite by the addition of sodium sulfite to the solution. The remaining liquid which contains primarily sodium acetate, sodium sulfite and sodium sulfate is then processed as shown in FIG. 3 to recover and recycle the acetate.

Figure 3:
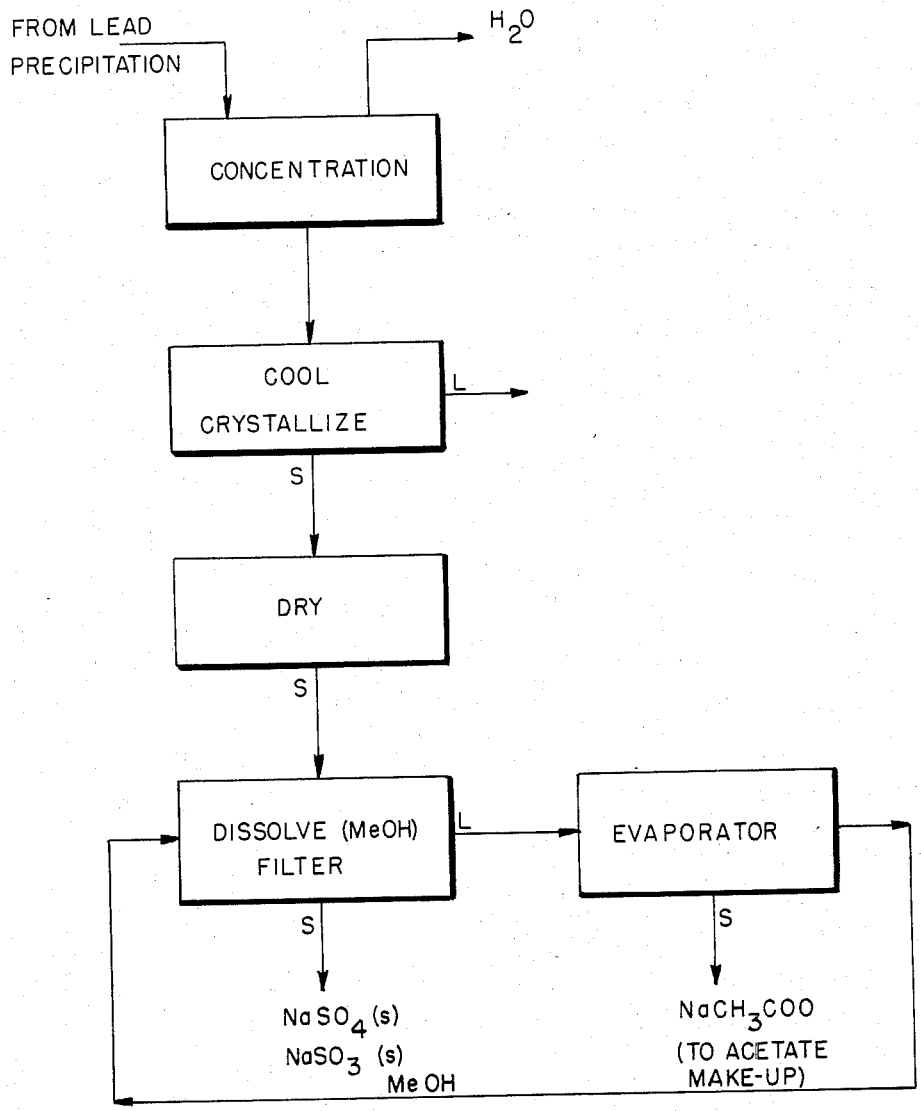
FIG. 3 is a detailed flow diagram of the acetate recovery process set forth in FIG. 2.

In accordance with FIG. 3, the acetate solution remaining after lead precipitation is heated so as to drive off water and concentrate the solution. The heated solution is then cooled so as to crystallize the acetates (along with sulfite and sulfate impurities) from the solution. The crystals are collected by filtration and dried. The dried acetate crystals are then dissolved in alcohol, e.g, methanol. The sulfate and sulfite crystals are insoluble in this solvent and are separated by filtration. The alcohol is then evaporated and recycled for use in dissolving more acetate and the acetate crystals which remain after alcohol evaporation are utilized for the acetate make-up bath in the de-leading process.

It should be obvious to one skilled in the art that while the invention is set forth utilizing the sodium salts of the various materials, e.g., sodium acetate and sodium sulfite, other soluble salts, such as the potassium or ammonium salts may be substituted for the sodium salt.

EXAMPLE I

Tankhouse slime was dried, ground and leached with hot 3M sulfuric acid and air so as to remove the majority of the copper from the slime as soluble copper sulfate. Generally about 500 to 800 g slime/liter acid was used. Following decopperization, the remaining slurry was filtered hot and the filter cake was washed with hot water to remove any remaining copper sulfate.

The remaining slurry was then de-leaded by contacting it with 4M sodium acetate solution from the secondary leach stage for one hour, and then filtered. This is the primary leach. The precious metal-containing slime filter cake was then leached again with 4M sodium acetate. This is the secondary leach stage. The remaining solids are slurried and washed until lead free with 0.1N acetic acid to insure removal of the soluble lead acetate.

The acetate solution for the secondary leach is made from the acetic acid wash solution and fresh sodium acetate. Therefore, no lead containing wash stream is generated.

The lead loaded leach solution from the primary leach is treated with 1.5M $NaSO_3$ in a quantity sufficient to precipitate essentially all of the lead from the acetate solution. After filtration, the remaining sodium acetate solution, which also contains sodium sulfite and sodium sulfate impurities, is sent through the acetate recovery process. Lead removal by sulfite precipitation resulted in the removal of about 97% of the lead present. No precious metals were detected in the acetate solutions. An added advantage of sulfite precipitation is that any remaining copper is also removed as a sulfite.

The acetate recovery process is based upon the widely different solubilities of sodium acetate and sodium sulfate and sulfite in methyl alcohol. The solution to be treated is heated to remove as much water as possible. Only enough water should be left to support the tri-hydrate form of sodium acetate upon cooling and crystallization. The resulting crystals are dried at about 120° C. to remove any remaining liquid and waters of hydration to form anhydrous sodium acetate. The crystalline solid is then dissolved in anhydrous methanol (water content $\leq 5\%$) and the undissolved sodium sulfate and sodium sulfite are filtered. The sodium acetate is recovered by evaporation of the methanol. The evaporation methanol is condensed for reuse in the process, the sodium acetate which is recovered is added to the acetate make-up tank to obtain the desired acetate concentration.

The solids remaining after the lead has been removed contain the sought-after precious metals and is treated by dissolution in aqua regia, with or without a prior roasting step and then processed by methods known in the art to recover the precious metals.

Advantages of the method shown above are that no $Na_2SO_4$ wash stream is generated and that the loop balance for the acetate recycle stream with respect to lead and water build-up can be maintained without adding excessive amounts of $Na_2SO_3$ It is to be understood that the above-described embodiments are simply illustrative of the principles of the invention. Various other modification and changes may be devised by those skilled in the art which will embody the principles of the invention and fall within the spirit and scope thereof.

What is claimed is:

1. A method of separating acetate ions from sulfite and sulfate ions in an aqueous solution comprising the steps of:
    (a) evaporating a substantial portion of the water from the acetate solution;
    (b) crystallizing the acetate;
    (c) drying the crystals;
    (d) redissolving the acetate crystals in essentially water free alcohol;
    (e) filtering off any insoluble material; and
    (f) evaporating the alcohol from the solution to leave purified acetate crystals.

2. The method recited in claim 1 including the steps of condensing and collecting the evaporated alcohol and reusing it to dissolve additional dried acetate crystals.

3. The method recited in claim 1 wherein the aqueous acetate is selected from the group consisting of an alkali metal acetate and ammonium acetate.

4. The method recited in claim 1 wherein the acetate is present as sodium acetate.

5. The method recited in claim 1 wherein the alcohol is methanol having no more than 5% water therein.

6. The method recited in claim 1 wherein evaporation is done by heating the solution to drive out substantially all the water in excess of that necessary to form the hydrated salt and wherein crystallization occurs upon cooling the heated solution.

7. A method of separating lead from other metals wherein said lead is in the form of a water insoluble lead salt comprising the steps of:
  (a) treating the lead salt with an aqueous acetate solution to form a soluble lead acetate;
  (b) separating the lead-containing acetate solution from any solids;
  (c) adding a soluble sulfite to the acetate solution to precipitate lead sulfite;
  (d) separating the lead sulfite precipitate from the solution;
  (e) recovering the acetate from the now essentially lead-free solution by the method comprising the steps of: (1) evaporating a substantial portion of the water from the acetate solution; (2) crystallizing the acetate; (3) drying the crystals; (4) redissolving the acetate crystals in essentially water free alcohol; (5) filtering off any insoluble material; and (6) evaporating the alcohol from the solution to leave purified acetate crystals.

8. The method recited in claim 7 wherein the recovered acetate is reused to form the aqueous acetate solution employed for dissolving the lead salt.

9. The method recited in claim 7 including the steps of condensing and collecting the evaporated alcohol and reusing it to dissolve additional dried acetate crystals.

10. The method recited in claim 7 wherein the aqueous acetate is selected from the group consisting of an alkali metal acetate and ammonium acetate.

11. The method recited in claim 10 wherein the acetate is sodium acetate.

12. The method recited in claim 7 wherein the alcohol is methanol having no more than 5% water therein.

13. The method recited in claim 7 wherein evaporation is done by heating the solution to drive out substantially all the water in excess of that necessary to form the hydrated salt and wherein crystallization occurs upon cooling the heated solution.

14. A method for purifying tankhouse slime including the steps of removing copper from the slime, removing lead from the decopperized slime, dissolving the remaining slime residue in aqua regia and processing to recover precious metal from the solution wherein the lead is removed by treating the decopperized slime in accordance with the method set forth in claim 7.

15. The method recited in claim 14 wherein the copper is removed by dissolving it as copper sulfate resulting from treating the slime with sulfuric acid and air.

16. The method recited in claim 14 including the steps of condensing and recycling the evaporated alcohol.

17. The method recited in claim 14 wherein the acetate is sodium acetate.

18. The method recited in claim 14 wherein the alcohol is methanol having from 0-5% water therein.

19. The method recited in claim 14 wherein evaporation is done by heating the solution to drive out substantially all the water in excess of that necessary to form the hydrated salt and wherein crystallization occurs upon cooling and heated solution.

* * * * *